Aug. 17, 1943.  J. C. DRADER  2,326,932
HOB
Original Filed Oct. 21, 1935   2 Sheets-Sheet 1
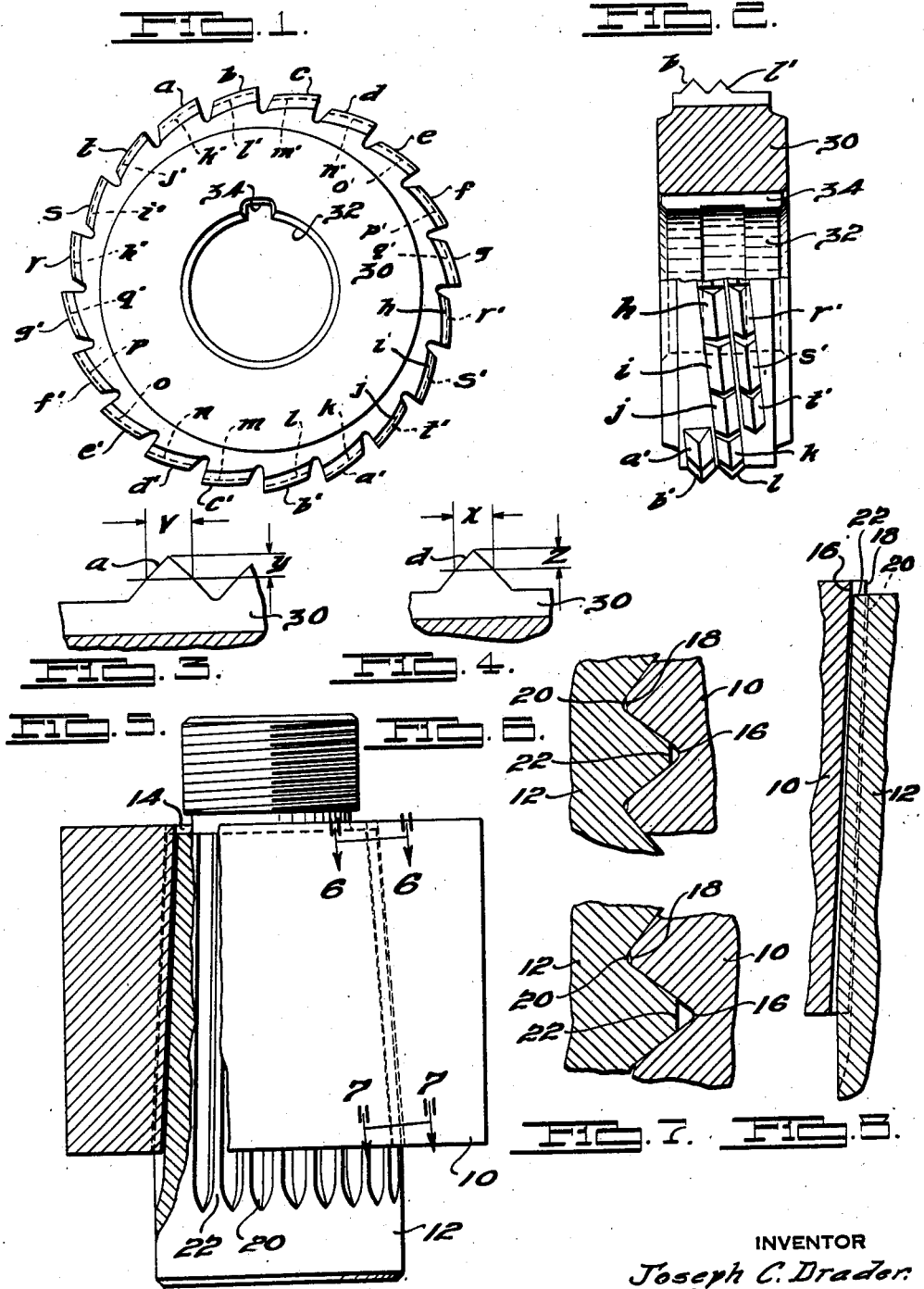
INVENTOR
Joseph C. Drader
BY
Harness, Dickey & Pierce
ATTORNEYS.

Aug. 17, 1943.  J. C. DRADER  2,326,932
HOB
Original Filed Oct. 21, 1935    2 Sheets-Sheet 2
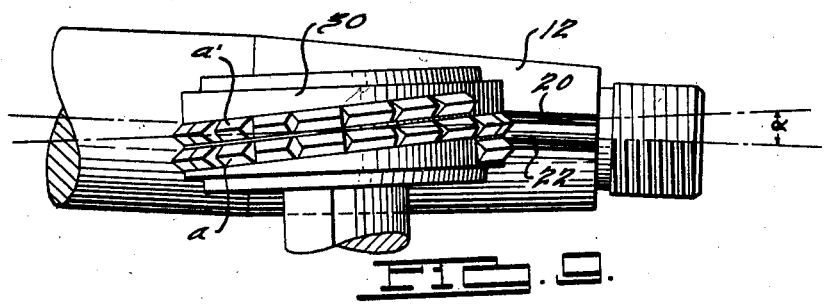
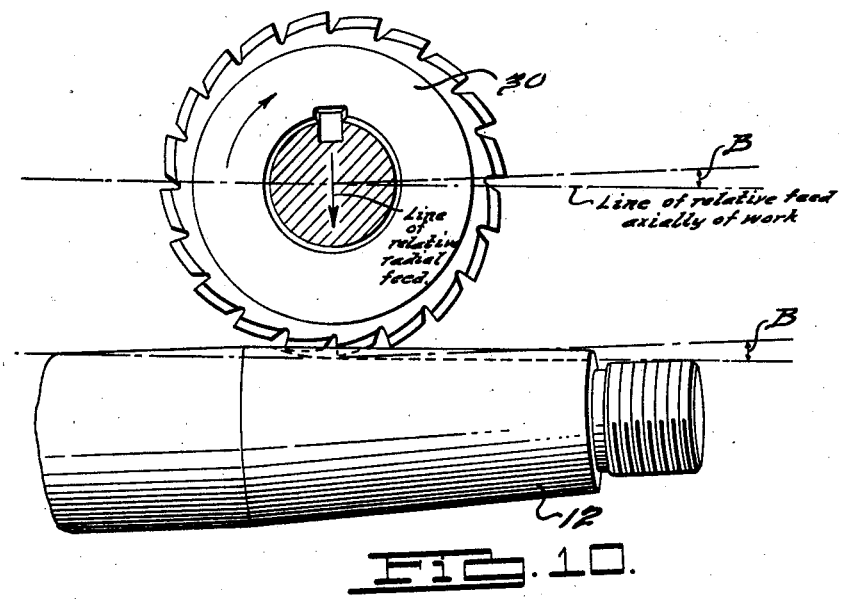
INVENTOR
Joseph C. Drader.
BY
Harness, Dickey & Pierce
ATTORNEYS.

Patented Aug. 17, 1943

2,326,932

UNITED STATES PATENT OFFICE 2,326,932

HOB

Joseph C. Drader, Detroit, Mich., assignor to Michigan Tool Company, Detroit, Mich., a corporation of Delaware Original application October 21, 1935, Serial No. 45,879. Divided and this application May 11, 1939, Serial No. 273,070

3 Claims. (Cl. 29—103)

This application is a division of applicant's prior co-pending application Serial No. 45,879, now Patent No. 2,164,643, of July 4, 1939, and relates to a hob for cutting tapered splines. The invention set forth in applicant's prior co-pending application is directed specifically to the method of forming tapered splines which embodies the hob covered herein.

Principal objects of the present invention include the provision of an apparatus for forming a tapered spline connection; to provide such a connection in which a tapered hub is provided with spline grooves of varying depth along its length, separated by lands of uniform width; in which a correspondingly tapered axle is provided with grooves which are of uniform section throughout their length and are separated by lands of varying width; and in which, in assembled relation, the roots of the grooves in the axle lie parallel to the surfaces of the lands formed in the hub.

Further objects of the present invention include the provision of an improved method for forming a splined connection, as above stated, in which the grooves in the axle are cut through use of a hob; in which the axle is disposed with its surface longitudinally tangential to the surface of the hob at the point of contact between the hob and the surface, to thereby cut grooves of uniform section; and the axes of the hob and axle are crossed at an angle equal to the hob helix angle to thereby cut serrations in the axle parallel with the axle axis; in which the variation in peripheral spacing between the grooves in the axle from the small end to the large end thereof, is automatically provided for by the difference in peripheral speed between the small end and the large end, thus permitting a uniform rate of rotation of the axle during the cutting operation.

Further objects of the present invention include the provision of an improved ground hob particularly adapted to the formation of the splines in an axle, as above stated, but also adapted to other uses as well, and in which the teeth of the hob are of varying size around the hob; in which the teeth of the hob are divided into finishing teeth and roughing teeth, the roughing teeth being of reduced size; in which the hob is provided with a double thread, corresponding cutting edges in the two threads being in diametrically opposed relation upon the hob.

With the above and other objects in view, which appear in the following description and in the appended claims, an illustrative and preferred embodiment of the present invention is shown in the accompanying drawings, throughout the several views of which corresponding reference characters are used to designate corresponding parts, and in which:

Fig. 1 is a view in end elevation of a hob embodying the present invention;

Fig. 2 is a view, partly in vertical section, of the hob shown in Fig. 1;

Fig. 3 is a fragmentary view illustrative of the dimensions of the finishing cutting edges of the hob of Fig. 1;

Fig. 4 is a fragmentary view illustrative of the dimensions of the preliminary cutting teeth of the hob of Fig. 1;

Fig. 5 is a view in elevation, partly in section, of the improved splined connection of the present invention;

Fig. 6 is a fragmentary view in section, taken along the line 6—6 of Fig. 5;

Fig. 7 is a fragmentary view in section, taken along the line 7—7 of Fig. 5;

Fig. 8 is a fragmentary view in section, illustrating the parallel relation which preferably exists between the roots of the grooves formed in the axle, and the surfaces of the lands formed in the hub; and Figs. 9 and 10 are views illustrative of the relative dispositions of the tool and the work in the preferred practice of the invention.

The novel features of the present invention are disclosed in the present application as embodied in an improved tapered splined connection, a method of producing such a connection, and an improved ground hob for forming serrations in a tapered object. The tapered spline connection comprises a tapered hub, and a correspondingly tapered axle. The axle and the hub are correspondingly serrated to form a slidable but non-rotative connection between them. The serrations in the hub constitute a succession of grooves, the depth and section of which increase from the small end to the large end thereof by an amount sufficient to cause the lands between the grooves to be of uniform size throughout the length of the hub. The hub serrations may be produced in various ways, forming no part of the present invention. For example, as will be understood, these serrations may be formed by a broaching operation, the path of movement of the broach being angled to the slope of the tapered surface of the hub by an amount sufficient to gradually change the section of each groove to the extent just stated.

The serrations in the axle are preferably of uniform section throughout their length. Due to the taper of the axle, accordingly, the uniform serrations therein are separated by lands the width of which increases from the small end of the axle to the larger end by an amount dependent upon the taper of the axle. The axle thus serrated mates in correct splined relation with the hub, the roots of the axle serrations being parallel along their length with the surfaces of the uniform lands formed in the hub.

According to the present invention, the serrations in the axle are cut by running the axle in synchronism with a hob. The hob and axle axes are crossed at an angle to each other equal to the helix angle of the hob so that, as will be understood, the serrations cut in the axle surface have a zero helix angle, or are parallel with the axis of the axle. Because of the taper of the axle, it will be understood that the peripheral speed at the smaller end is somewhat less than the peripheral speed at the larger end, and while this variation in peripheral speed along the length of the tapered surface automatically produces the correct variation in width of the lands which separate the serrations in the axle, it renders it desirable to modify the teeth of the hob so that certain of the teeth perform only a roughing operation and others perform a finishing operation.

The improved hob of the present invention embodies two threads or helical rows of teeth, each row being illustrated as comprising twenty teeth. The corresponding teeth in the two rows are disposed in diametrically opposite relationship, since, as will be understood, the respective rows of teeth cut alternate serrations in the axle. Of the teeth in each row, those which may for convenience be designated as teeth a, b, and c are finished to the form of the desired serrations, and substantially correspond to the dimensions of the serrations. The remaining teeth in each row are not finished to this form, since such teeth perform only a preliminary cutting or roughing operation. Of such remaining teeth, teeth d, e, f, and g are reduced in size so that they present a section somewhat smaller than the desired section of the serrations. Preferably also, the teeth last identified are re-cut so that the lead of the right sides thereof is somewhat less than the lead of the finish teeth a, b, and c, and the lead of the left sides thereof is somewhat in excess of the finish teeth lead. The remaining teeth in each row, h, i, j, k, l, m, n, o, p, q, r, s, and t are of still further reduced section, although the lead thereof may, and preferably does, correspond to the lead of the finish teeth a, b, and c.

With this relation, as will be understood, the finish teeth a, b, and c correspond in function in certain respects to the teeth of a fly cutter, and cut serrations in the axle which are of the desired final section and substantially parallel along their lengths to the axis of the axle. The remaining teeth of reduced section supplement the action of the finish teeth and perform a preliminary cutting action. The reduction in size thereof compensate for the unbalance between the lead of the hob teeth and the varying peripheral speed of the axle, and prevents distortion of the serrations.

It has been found in the practice of the present invention that the use of a hob constructed in accordance with the above stated principles results in the production of serrations in tapered objects which are substantially straight, and which satisfactorily and accurately mate with the previously mentioned serrations formed in the hub. The use of a hob for this purpose has been found to materially increase the rate at which the serrations may be cut in the axle.

Considering the above mentioned elements in more detail, and referring to the drawings, the completed illustrative tapered spline connection comprises the hub 10 and the axle 12. Hub 10 is provided with a central axial opening 14, which in accordance with conventional construction, is generally circular. The opening 14 is somewhat larger at one end than at the other, thus providing a uniformly tapered surface. The inner surface of the bore 14 is serrated to provide a succession of grooves 16, separated by lands 18. As previously stated, the grooves 16, while having uniformly angled side faces throughout their length, are deeper at their larger end than at the smaller end, by an amount sufficient to maintain the lands 18 of uniform width throughout the length of hub 10. As will be understood, the formation of the serrations within the hub 10 may be effected in various ways. For example, a broaching operation may be used, the axis of the broach being angled to the surface of the opening 14 by an amount sufficient to provide the desired increasing depth of groove.

The axle 12 is tapered to correspond to the taper of hub 10 and the surface thereof is serrated to provide a plurality of grooves 20 separated by lands 22. As previously stated, the grooves 20 are of uniform section throughout their length, and with this relationship it will be evident that the lands 22 increase in width from the smaller end of the serrated section to the large end thereof. This relationship, as well as the above described relationship of the grooves 16 and lands 18 of hub 10 are clearly illustrated in the comparative views, Figs. 6 and 7.

In the assembled spline connection, the grooves 20 in axle 12 are of uniform section, having sides which lie parallel to the surfaces of the lands 18 formed in the hub 10 which are of uniform section. This relationship is illustrated in the fragmentary view, Fig. 8. It will be evident that the surface connection thus provided between the hub and axle provides a positive drive relation therebetween and effects a positive limit to their axial movement.

The hob 30, shown in detail in Figs. 1 through 4, and which is preferably used to form the serrations in the axle 12, is provided with an accurately dimensioned central opening 32 and keyway 34, through which it may be secured to an arbor for rotation thereby. The hob is provided on its surface with a double row of teeth, the teeth in one row being designated a, b, c, etc., and the teeth in the other row being designated a', b', c'. It will be understood that the two rows of teeth are duplicates of each other and that corresponding teeth in the respective rows, such as teeth a and a', are disposed in diametrically opposed relationship. It will also be understood that in operation, the row of teeth including teeth a, b, c, etc. and the teeth in the other row, respectively, cut alternate serrations in the surface of axle 12.

As previously described in a general way, the teeth a, b, and c, and the corresponding teeth a', b', and c' are ground to the correct form and proper dimensions of the grooves 20 to be formed in the axle 12. These teeth perform a finishing function, and may be said to function much as a fly cutter.

The teeth *d, e, f, g,* and the corresponding teeth *d', e', f',* and *g'* in the adjacent row are reduced in size as compared to the finishing teeth and in practice it is not necessary that these teeth be ground to accurate tooth form, as they accomplish merely a roughing operation. The comparative dimensions of the finishing and roughing teeth are illustrated in the fragmentary views of Figs. 3 and 4 in which the dimensions *v* and *y*, respectively, applied to a tooth *a*, are larger than the corresponding dimensions *x* and *z* applied to one of the teeth *d*.

The remaining teeth of each row including teeth *h, i . . . s,* and *t* and teeth *h', i' . . . s'* and *t'* are further reduced in size. As previously stated, the leads of the last identified teeth may correspond to the leads of the finishing teeth *a, b, c,* etc. but the lead of the right hand sides of the intermediate teeth *d,* etc. is preferably somewhat less than such lead, and the lead of the left hand sides of the intermediate teeth is preferably somewhat in excess of such lead.

In operation, the hob 30 is disposed with its axis at an angle to the axis of the axle 12, equal to the helix angle of the hob, so that the serrations cut in the axle are straight or parallel to the axis of the axle. It will be understood that hob 30 and axle 12 are fed into each other radially during the cutting operation, and that axle 12 is indexed along axially from time to time to extend the grooves 20 therein to the desired length. As the hob and axle are indexed longitudinally relative to each other, the minimum spacing between the hob axis and the axle surface is maintained constant, so that the serrations are of uniform section throughout their length. As previously stated, due to the tapering surface of axle 12, the peripheral speed at the reduced end of the serrated section is somewhat less than the peripheral speed at the enlarged end of the serrated section, and this difference in peripheral speed being proportional to the taper angle of axle 12, acts to automatically bring about the desired increasing width of the lands 22 when hob 30 and axle 12 are run together.

The rate of rotation of axle 12 is such that the average of the above stated peripheral speeds is correctly related to the lead of the rows of teeth on hob 30. At points on the surface of axle 12 having a peripheral speed other than such average value, a slight unbalance exists between the peripheral speed of the point being cut and the lead of the teeth on the hob 30. Any tendency, however, of this unbalance to cause the cutting of irregular grooves, is overcome by limiting the finishing action to a relatively few of the teeth, as above described, and reducing the size of the remaining teeth sufficiently to prevent them from distorting the serrations from straight form. The use of such remaining teeth, however, to perform a roughing operation, materially increases the rate at which the serrations may be cut and thus correspondingly reduces the cost of the completed spline connection.

Although a specific embodiment of the present invention has been described, it will be evident that various changes in the method of practicing it and in the form, number, and arrangement of parts of the preferred embodiment of it may be made within the spirit and scope thereof.

What is claimed is:

1. A hob-like tool having a cylindrical body portion and two rows of like teeth adjacently disposed and helically positioned on the surface of the body portion, certain of the teeth of each row increasing in height from starting points diametrically disposed.

2. A hob-like tool having a cylindrical body portion and two rows of like teeth adjacently disposed and helically positioned on the surface of the body portion, certain of the teeth of each row increasing in height from starting points diametrically disposed, the end teeth of the rows being complementary in form to the space to be cut thereby.

3. A hob-like tool having a cylindrical body portion and two rows of like teeth helically disposed on the surface thereof, the teeth at the beginning of each row being smaller than the finishing teeth at the end of each row, with the teeth at the beginning of each row being disposed at points diametrically opposite each other.

JOSEPH C. DRADER.